(12) United States Patent
Keita et al.

(10) Patent No.: US 6,416,689 B1
(45) Date of Patent: Jul. 9, 2002

(54) METHOD FOR MOLDING PLASTIC LENSES

(75) Inventors: Gabriel Keita, Oldsmar; Yassin Yusef Turshani, Largo, both of FL (US)

(73) Assignee: Essilor International Compagnie General d'Optique, Charenton Cedex (FR)

( * ) Notice: Subject to any disclaimer, the term of this patent is extended or adjusted under 35 U.S.C. 154(b) by 0 days.

(21) Appl. No.: 09/814,318

(22) Filed: Mar. 21, 2001

(51) Int. Cl.$^7$ .............................................. B29D 11/00
(52) U.S. Cl. ........................... 264/1.1; 264/1.7; 264/2.7
(58) Field of Search .............................. 264/1.1, 1.36, 264/1.7, 2.7, 1.38; 425/808; 249/117, 134, 160

(56) References Cited

U.S. PATENT DOCUMENTS

| | | |
|---|---|---|
| 3,070,846 A | 1/1963 | Schrier |
| 3,938,775 A * | 2/1976 | Sarofeen ................. 425/808 |
| 5,110,514 A | 5/1992 | Soane |
| 5,547,618 A | 8/1996 | Magne ................. 264/1.36 |
| 5,605,656 A * | 2/1997 | Sasano ................. 264/1.1 |
| 5,662,839 A | 9/1997 | Magne ................. 264/1.38 |
| 5,973,098 A | 10/1999 | Keita et al. ................. 528/65 |

FOREIGN PATENT DOCUMENTS

EP 998951 6/2000

* cited by examiner

*Primary Examiner*—Mathieu D. Vargot
(74) *Attorney, Agent, or Firm*—Fulbright & Jaworski, L.L.P.

(57) ABSTRACT

The method for making an optical lens which includes:
filling a molding cavity vertically oriented and defined by two mold pieces at the periphery of which is disposed an annular closure member with a polymerizable synthetic composition through a disposable check valve provided in the closure member;
polymerizing the composition to form the lens; and
recovering the lens with the disposable check valve imprisoned within the polymerized composition at the periphery thereof.

8 Claims, 2 Drawing Sheets

METHOD FOR MOLDING PLASTIC LENSES

BACKGROUND OF THE INVENTION

1. Field of the Invention

The present invention concerns molding optical lenses, in particular ophthalmic lenses, from a polymerizable synthetic composition.

2. Description of the Prior Art

The traditional mold comprises two pieces, typically made of mineral glasses, at the periphery of which is disposed an annular closure member, such as a gasket or an adhesive tape, defining with them the required molding cavity.

The conventional way to fill a two-piece mold as above is by causing the molding material to flow into the molding cavity through a casting opening provided for this purpose in the closure member.

In at least partly automated process, the mold to be filled is vertically aligned with a filling device adapted to deliver a particular quantity of molding material through a nozzle.

One possibility with such a vertically oriented mold is to fill the molding cavity by gravity only through a nozzle disposed on the top of the mold periphery. See for example U.S. Pat. No. 5,110,514.

Experience has shown that unless special measures are implemented, for example a relatively long waiting time (in the order of two hours, for example) between filling the mold and starting polymerization, the optical lenses obtained frequently have localized optical defects of greater or lesser severity, leading to relatively high reject rates.

To overcome the above problems, U.S. Pat. Nos. 5,547,618 and 5,662,839 propose filling the molding cavity of a two-piece mold vertically oriented through a casting opening formed in a lower part of the closure member and using pumping means adapted to cause the molding material to flow without significantly pressurizing it.

Typically filling of the molding cavity is effected using a pipe connected to a pressurized molding material reservoir and applied, like a filling nozzle, to the casting opening.

With such a method, it is possible to start polymerization immediately after filling.

However, in the case of molding material reacting at room temperature in less than 10 minutes, such as the formulation disclosed in U.S. Pat. No. 5,973,098, the pipe will clog quickly.

Using a flap valve as disclosed in U.S. Pat. No. 3,070,846 will also not be a solution since the clogging problem will still be present.

Thus, the object of the present invention is to provide a method for molding optical lenses, in particular ophthalmic lenses, from a polymerizable synthetic composition, in particular a fast curing composition, using a vertically held two-piece mold which remedies to the drawbacks of the prior art methods and molds.

A further object of the invention is to provide a method as above in which the mold is filled from the bottom.

This is achieved according to the invention by a method of making an optical lens which comprises:

filling a molding cavity vertically oriented and defined by two mold pieces at the periphery of which is disposed an annular closure member with a polymerizable synthetic composition through a disposable check valve provided in the closure member;

polymerizing the composition to form the lens; and recovering the lens with the disposable check valve imprisoned within the polymerized composition at the periphery thereof.

The check valve is preferably provided in a bottom part of the closure member.

Preferably, the check valve is a duck bill valve. Duck bill valves are well known and commonly used for medical injection.

An embodiment of a duck bill valve is disclosed in EP 0,998,951.

Other duck bill valves are commercialized by VERNAY LABORATORIES.

The check valves, and in particular the duck bill valves, can be made of any suitable material such as aluminum, stainless steel, copper, brass, polypropylene, polytetrafluoroethylene (PTFE) and poly(tetrafluoroethylene/perfluorinated vinyl ether).

Preferably the polymerizable synthetic composition is a room temperature curing composition, and in particular a fast curing composition, i.e. a composition which cures within 10 minutes or less at room temperature. Such a composition is disclosed in U.S. Pat. No. 5,973,098.

DESCRIPTION OF THE PREFERRED EMBODIMENT

Figure 1:
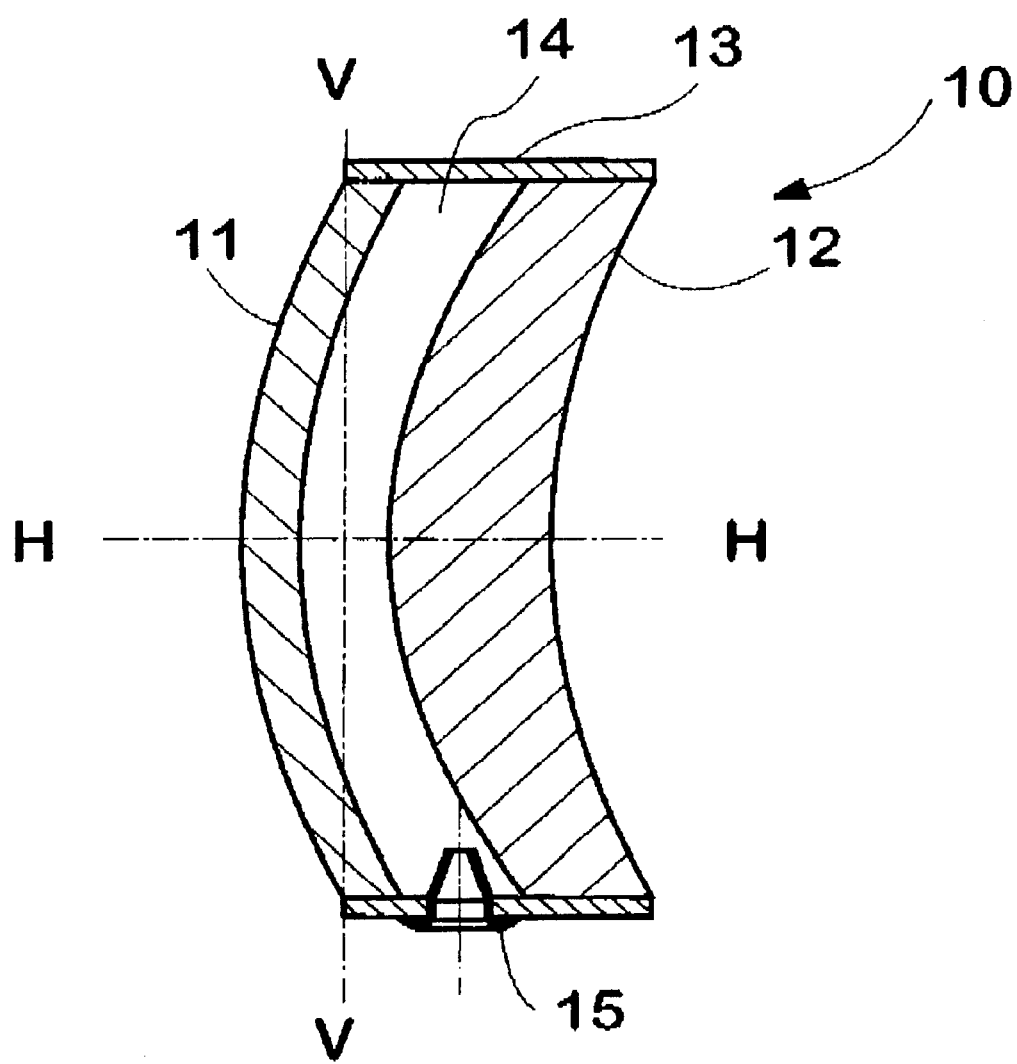
FIG. 1 is a cross-sectional schematic view of a two-piece mold and a check valve for implementation of the method according to the invention.

As shown in FIG. 1, there is a represented in cross-section a view of a two-piece mold 10 and a check valve 15.

The two-piece mold 10 comprises a front piece 11 and a back piece 12, preferably made of mineral glass, and an annular closure member 13, such as an adhesive tape, disposed at the periphery of the two pieces 11, 12. The two pieces 11, 12 and the annular closure member 13 define together a molding cavity 14 which, as represented in FIG. 1, is intended for molding a minus ophthalmic lens.

The molding cavity 14 comprises an upper half and a lower half symetrically arranged with regard to a central horizontal axis HH of the mold 10, the mold being held vertically or on the edge, i.e. with the molding cavity extending in the direction of a vertical axis perpendicular to the central horizontal axis HH.

Figure 2A:
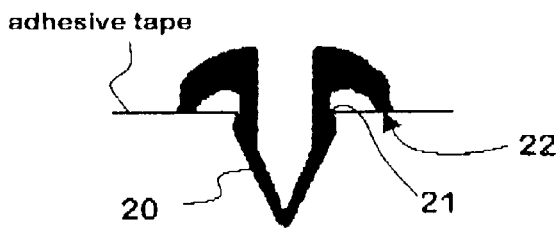
FIGS. 2A to 2I are examples of commercially available duck bill. valves usable in the method according to the invention.
Figure 2F:
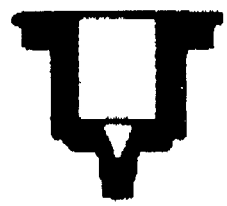
Figure 2B:
Figure 2G:
Figure 2C:
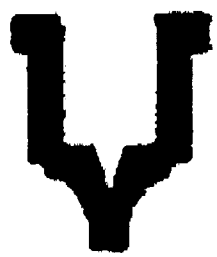
Figure 2H:
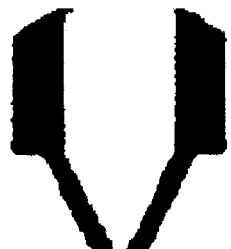
Figure 2D:
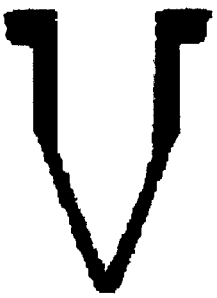
Figure 2I:
Figure 2E:

A check valve 15, in the embodiment of FIG. 1, a duck bill valve as shown in FIG. 2A, is arranged in an opening managed in the lower or bottom part of closure member 13 in order to establish flow communication from the outside of the mold 10 into the molding cavity 14.

In use duck bill valve 15 is connected through a pipe (not shown) to a pressurized reservoir (not shown) containing the polymerizable synthetic material. A dosing valve (not shown) may be connected between the pressurized reservoir and the pipe to control the delivery of polymerizable synthetic material to the duck bill valve 15.

As it is well known, the duck bill valve is initially closed and opened under the slight pressure exerted by the material delivered from the reservoir, thus filling the molding cavity.

Once the molding cavity has been completely filled with the polymerizable material and polytherization of the material as occurred, the mold 10 can be disassembled as usual, leaving the duck bill valve 15 an imprisoned within the polymerized material.

A The recovered lens can then be edge machined to eliminate the duck bill valve 15 in order to obtain a finished lens.

Of course, other types of duck bill valves as shown in FIGS. 2B to 2I can be used instead of the duck bill valve of FIG. 2A.

EXAMPLE 1

A mold assembly was formed of a front and a back mineral glass piece treated with a silicone mold release agent and assembled by means of an adhesive tape.

The front and back pieces were as follows:

|  | Front concave piece | Back convex piece |
|---|---|---|
| Curvature radius - mm | 168 | 103 |
| Diameter - mm | 83 | 83 |

A 4 mm diameter mole was pinched into adhesive tape and a duck bill valve as shown in FIG. 2A was inserted in the mole.

The duck bill valve of FIG. 2A is made of an elastomeric polymer and its shape can be modified at the time the valve is inserted in the hole made in the adhesive tape, the valve recovering thereafter its initial shape.

The duck bill valve of FIG. 2A comprises the valve itself (20) and two abutment members (21, 22) facing each other and co-operating with the adhesive tape to firmly hold the valve and avoid leakages of polymerizable material.

More precisely, the first abutment member (21) situated in a position close to the valve itself (20) is an annular flange having a diameter slightly higher than the diameter of the duck bill valve itself (20).

The second abutment member 22 is a flange of higher diameter than the flange constituting abutment member 21.

The mold was maintained on edge with the duck bill valve at its bottom and a polymerizable composition prepared according to example 1 of U.S. Pat. No. 5,973,098 was introduced in the molding through the duck bill valve.

After 5 minutes at room temperature a gel is obtained.

The mold assembly was then placed in an air oven and heated at 120° C. for 2 hours.

Thereafter, the mold assembly was withdrawn from the oven, the tape is removed and the mold pieces disassembled to recover the lens with the duck bill valve imprisoned in the polymerized material.

The duck bill valve was later removed through classical edge machining of the lens.

What is claimed is:

1. A method for making an optical lens which comprises:

filling a molding cavity vertically oriented and defined by two mold pieces at the periphery of which is disposed an annular closure member with a polymerizable synthetic composition through a disposable check valve provided in the closure member;

polymerizing the composition to form the lens; and recovering the lens with the disposable check valve imprisoned within the polymerized composition at the periphery thereof.

2. The method of claim 1, wherein the check valve is a duck bill valve.

3. The method of claim 1, wherein the check valve is provided in a bottom part of the closure member.

4. The method of claim 1, wherein the annular closure member is an adhesive tape and the check valve is inserted into a hole pinched into the adhesive tape.

5. The method of claim 1, wherein the polymerizable composition is a room temperature polymerizable composition.

6. The method of claim 1, wherein the polymerizable composition is a fast room temperature polymerizable composition.

7. The method of claim 1, further comprising the step of edge machining the recovered lens to remove the check valve.

8. The method of claim 1, wherein the lens is a minus lens.

* * * * *